United States Patent Office 3,337,241
Patented Aug. 22, 1967

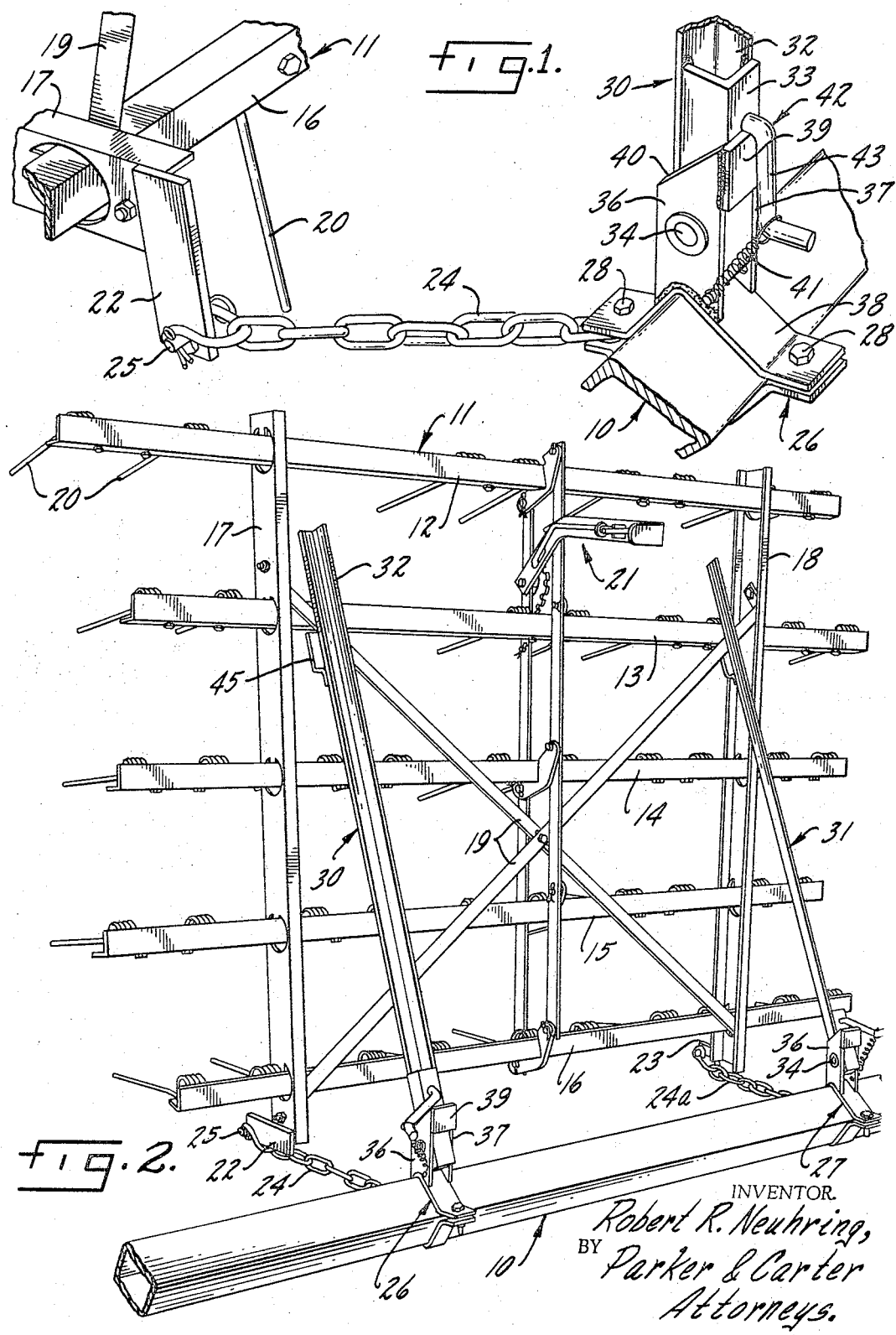

3,337,241
MOUNTING AND LOCKING DEVICE FOR
IMPLEMENT LIFT APPARATUS
Robert R. Neuhring, Sac City, Iowa, assignor to Noble Manufacturing Company, Sac City, Iowa, a corporation of Iowa
Filed Jan. 28, 1965, Ser. No. 428,666
3 Claims. (Cl. 280—411)

This invention relates generally to agricultural equipment and particularly to a mechanism for connecting and disconnecting an agricultural implement, such as a harrow, to a pulling structure, such as a drawbar, for placement of the implement in field and transport positions.

Many agricultural implements, of which harrows are good examples, are connected to drawbars or other structures which in turn are connected to a tractor which pulls the entire assembly through a field to be worked. When the implement is to be transported from the barn to the field or from field to field it must be raised out of contact with the ground. One conventional mode of holding the implements in transport position utilizes one or a plurality of riser structures which extend generally vertically upwardly from the drawbar. Often these riser structures are rigid with respect to the drawbar. Frequently they include a locking structure near the upper end of eah riser which is constructed to engage and hold the agricultural implement in an elevated position out of contact with the ground.

Usually the operator must manually lift the complete weight of the agricultural implement up to a riser for supporting it in a transport position. In addition to being fatiguing this limits the size of the implement to that size which can be conveniently lifted by an operator.

Accordingly, one of the primary objects of this invention is to provide means for moving an agricultural implement from a marking or a field position to an elevated or transport position which does not require an operator to lift the entire weight of the implement.

Another object is to provide a means for moving an agricultural implement from field to transport position, and vice versa, in which the implement is automatically locked into transport position by a gravity actuated locking mechanism.

A further object is to provide a mechanism for moving an agricultural implement from a field to a transport position, and vice versa, in which the implement, once in locked position, must be manually released whereby any tendency for the locking mechanism to be jarred loose due to travel or other causes is eliminated.

Other objects and advantages will become apparent from a reading of the following description of the invention.

The invention is illustrated more or less diagrammatically in the accompanying figures wherein:

FIGURE 1 is a partial, perspective view of a first embodiment of the invention showing a riser in a locked position;

FIGURE 2 is a perspective view, to a smaller scale than FIGURE 1, of the embodiment of FIGURE 1 illustrating the mechanism in an unlocked condition intermediate its generally vertical and generally horizontal positions.

Like reference numerals will be used to refer to like parts throughout the following description of the drawings.

Referring to FIGURES 1 and 2, the drawbar is indicated generally at 10 and a harrow section at 11. In this instance the drawbar is a rectangularly or diamond shaped structural member positioned with its longest cross-sectional dimension substantially horizontal with the ground. It should be understood however that the particular pulling or drawbar structure employed does not form an essential part of the invention except as it may provide a base for the mechanism to be described hereinafter. Likewise, although a harrow section has been illustrated for purposes of description, it should be clearly understood that the invention is equally applicable with other and quite different agricultural implements. The invention is, in fact, usable with nearly any kind of an implement which is pulled from an advancing structure when in contact with the ground, and carried by the advancing structure when out of contact with the ground.

Harrow section 11 consists essentially of a plurality of harrow tooth bars, 12, 13, 14, 15 and 16, which are maintained a fixed distance apart by struts 17 and 18 and diagonal cross braces 19.

A number of coil tine teeth 20 are bolted or otherwise suitably secured to the tooth bars 12–16. A linkage mechanism is indicated generally at 21, the function of which is to vary the angle of penetration of the coil tine teeth 20. Since the details of the linkage mechanism and the coil tine teeth are not of themselves an essential part of the invention they are not further illustrated or described.

A pair of towing brackets are indicated at 22 and 23 bolted, respectively, to the leading ends of struts 17 and 18. Short length of chain 24, 24a are connected at their trailing ends, as by pin 25, to the towing brackets and at their advancing ends to the drawbar 10 by clamps 26, 27 which encircle the drawbar and are held by bolts 28. It will be understood that when the harrow section 11 is in the towing position illustrated in FIGURE 1 it is pulled through the soil by the drawbar 10, the drawbar in turn being connected to a tractor or other pulling machine by any suitable structure.

A pair of riser assemblies are indicated generally at 30 and 31. Since both are identical in construction a description of one will suffice for a description of both.

Riser assembly 30 consists of an angle iron 32 to which a short piece of a similarly shaped angle iron 33 has been welded. The two pieces form a hollow box section. The riser is pivoted for counter-clockwise movement from the position of FIGURE 1 about a pivot 34 which passes through aligned apertures in the box section (not shown) and is rotatably supported in a pivot structure indicated generally at 35. In this instance pivot structure 35 consists essentially of a pair of upstanding brackets 36, 37 each of which is welded at its lower end to the top half 38 of the drawbar clamp 26. A plate 39 extending from between the two leading edges of brackets 36, 37 forms an abutment or movement limiting stop means which prevents clockwise movement of the riser 30 about pivot 34. The upper surface of each of brackets 36, 37 is cut at an angle with the horizontal to form a cam surface 40. A lever is indicated generally at 42, the lever being journaled in the box section of the riser. When the riser is in a vertical position the weight of lever 42 and spring 41 will cause the lever to move to the FIGURE 1 position. Spring 41 need not be disengaged at any time. In this position, shank portion 43 extends downwardly in front of plate 39 and the lever thereby prevents counter clockwise movement of the riser about pivot 34. When the lever is turned or rotated a distance sufficient to clear the upper corners of plate 39, as shown in FIGURE 2, the riser assembly is free to either swing counter clockwise downwardly or clockwise upwardly until abutment plate 39 prevents further movement. A suitable hook means is indicated at 45 for hooking the harrow section 11 to the riser when the riser is dropped downwardly to lay substantially parallel to the harrow section, and to form a support slot for the harrow section when the riser assembly is pivoted to its locked position with the section hooked to it.

The use and operation of the invention is as follows:

In FIGURES 1 and 2, the parts are shown in a locked, or transport position, in FIGURE 1, and in an unlocked position in FIGURE 2. Turning to FIGURE 1, first, riser assembly 30 is locked in a generally vertical position by lever 42 which extends substantially vertically downwardly and overlies striker plate 39. The riser assembly cannot pivot clockwise about its pivot 34 since plate 39 blocks its movement. The riser assembly cannot pivot counter-clockwise since lever 42 will strike against the forward face of the abutment plate 39.

When it is necessary to elevate the harrow section 11 to a transport position, lever 42 is rotated either clockwise or counterclockwise against the action of spring 41 a distance sufficient to clear the upper corner of abutment plate 39. This enables the riser assembly 32 to pivot counterclockwise about pin 34 until 33 strikes the underside of abutment plate 39. The length of abutment plate 39 is so selected that the riser assembly will strike it when the riser is in a position just a few inches or so above the normal position of harrow section 11 when it is in contact with the ground.

The operator then grasps harrow section 11 and lifts it a few inches until one of the toothbars, for example toothbar 13, can be slipped into hook 45.

Once the harrow section 11 has been hooked to the risers, the weight of the sections have been partially transferred from the ground to the pivot pins 34. The operator then pushes upwardly on the toothbar 12, thereby rotating the harrow section and risers 30, 31, clockwise about pivot pin 34 as a center. Since at least half of the weight of the harrow section and the riser is being supported by pivot pins 34, the weight the operator must lift is drastically reduced.

As the risers 30, 31, pivot about pins 34, the shank portions 43 of the levers 42 strike cam surfaces 40 of the pivot structures. As best shown in FIGURE 2, the left lever 42 is riding along the cam surface on bracket 36 and the right lever 42 is riding along the cam surface on bracket 37. When the risers 31, 32 reach their FIGURE 1 position levers 42 clear the upper corners of abutment plates 39 and the levers drop by gravity and the action of springs 41 into their FIGURE 1 position. The harrow section is thereby locked in a transport position.

Whereas one form of the invention has been shown and described herein, it should be realized that there are many modifications, alterations and substitutions thereto within the scope of the following claims.

I claim:
1. A mounting and locking structure for attachment to a drawbar to pivotally support a riser of the tilt-up type for movement from a generally upright position to a lowered position in which it extends towards an agricultural implement being pulled by the drawbar including:
   a pair of spaced upright brackets,
   means on the riser and said brackets to pivotally mount said riser between the brackets for rotation about a generally horizontal axis,
   a plate affixed to and extending between said brackets and positioned to have a side thereof engaged by said riser when said riser is in the upright position to limit rotation of the riser beyond said upright position in a direction away from the lowered position of the riser, and
   a lever pivotally mounted on said riser and adapted when said riser is in the upright position to engage the side of said plate opposite to the side engaged by said riser to lock said riser in said position.

2. The structure of claim 1 further characterized in that:
   said brackets have sloping top surfaces facing the lowered position of the riser to form cam surfaces, and
   said cam surfaces are adapted to engage said lever to move said lever clear of said plate as said riser approaches its upright position.

3. The structure of claim 1 further characterized in that a portion of said riser extends below the means on said riser and said brackets pivotally mounting the riser and this portion of the riser engages said plate when said riser is in its lowered position to limit rotation of said riser downwardly beyond said lowered position.

References Cited
UNITED STATES PATENTS

| | | | |
|---|---|---|---|
| 193,678 | 7/1877 | Unger | 292—238 |
| 199,964 | 2/1878 | Davenport | 292—238 |
| 891,667 | 6/1908 | Browning | 292—238 |
| 1,639,009 | 8/1927 | Singley | 287—99 |
| 2,152,421 | 3/1939 | Skoog | 296—43 |
| 2,580,117 | 12/1951 | McMackin et al. | 287—99 |
| 3,183,982 | 5/1965 | Kopaska | 172—624 |

LEO FRIAGLIA, *Primary Examiner.*